S. PICHAULT.
WINDMILL ACTUATED AIR COMPRESSOR.
APPLICATION FILED FEB. 12, 1908.
1,000,690.
Patented Aug. 15, 1911.
4 SHEETS—SHEET 1.
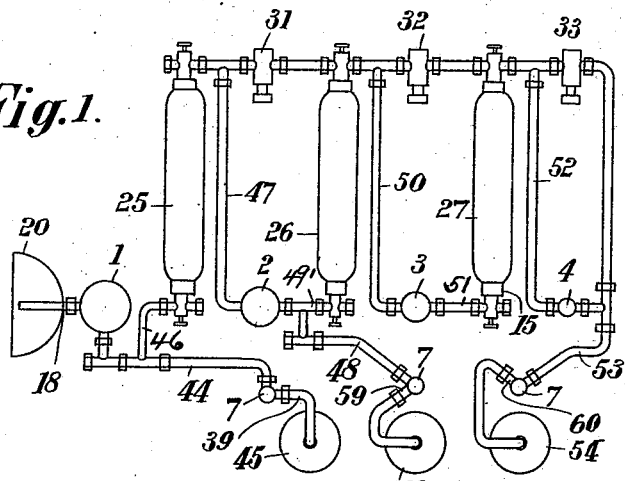
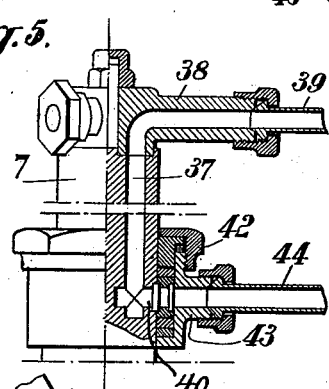
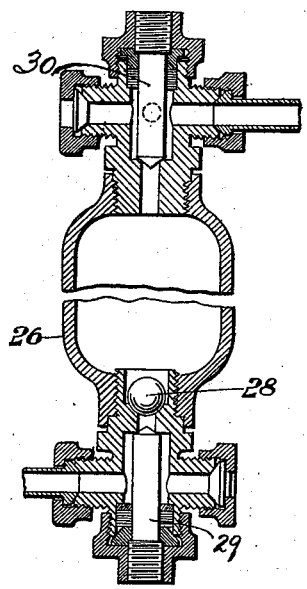
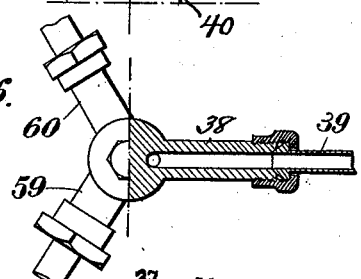
Witnesses:
M. H. Darg
L. A. Price
Inventor
Stéphane Pichault
By Wm E Boulter
Attorney.

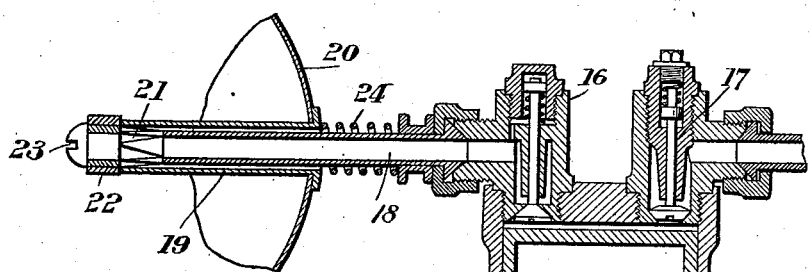
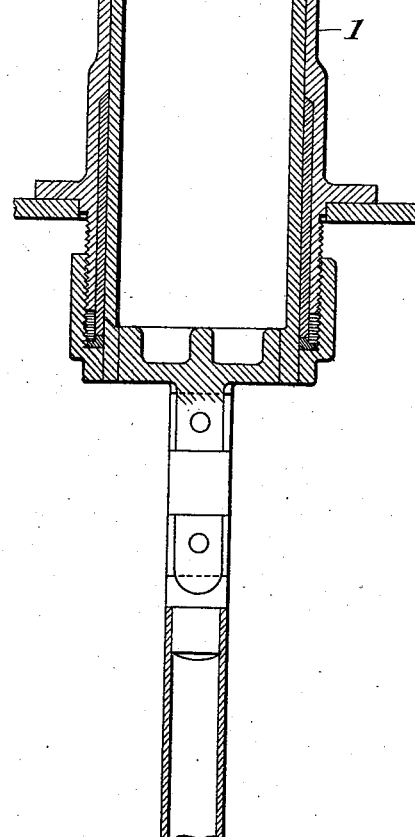

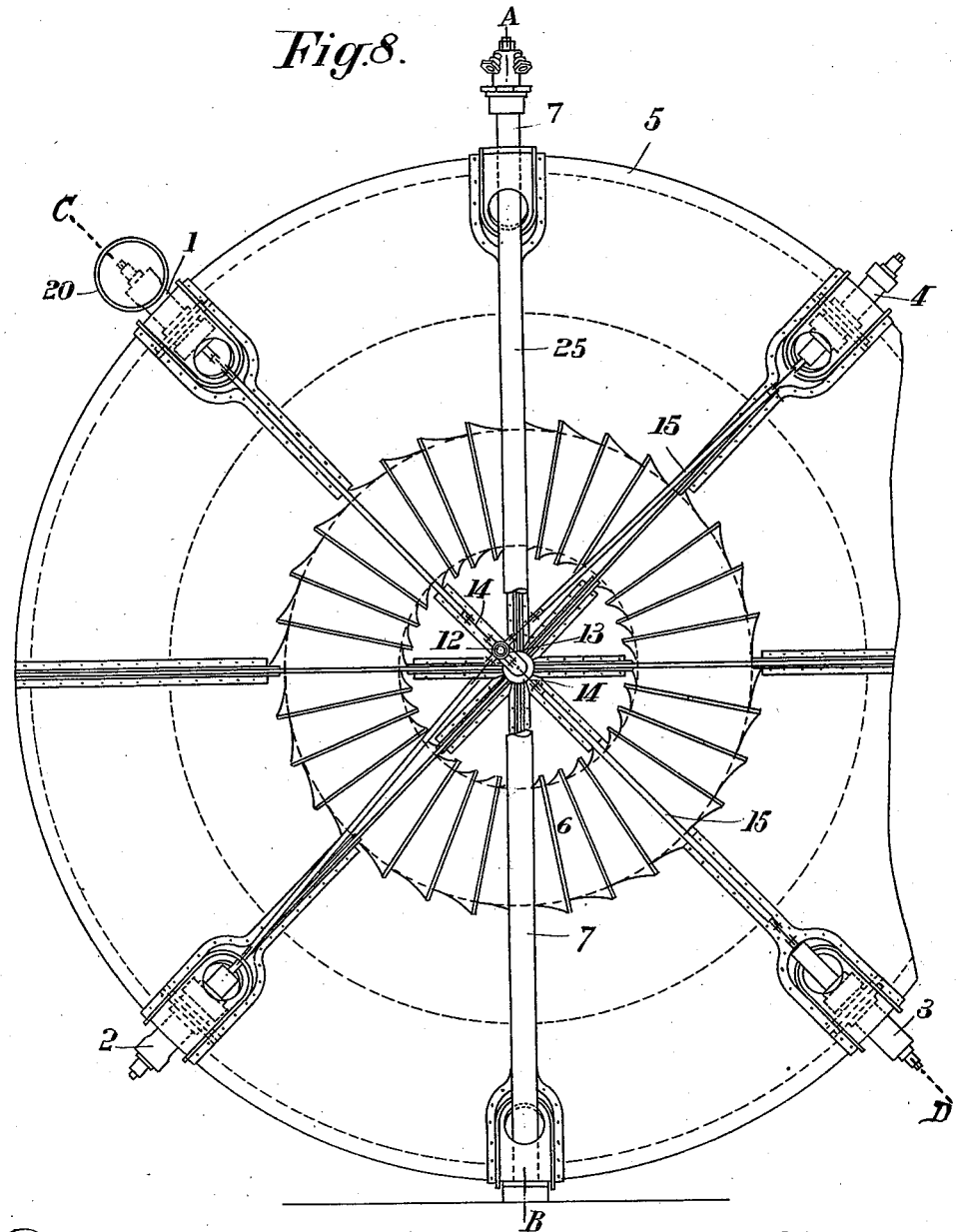

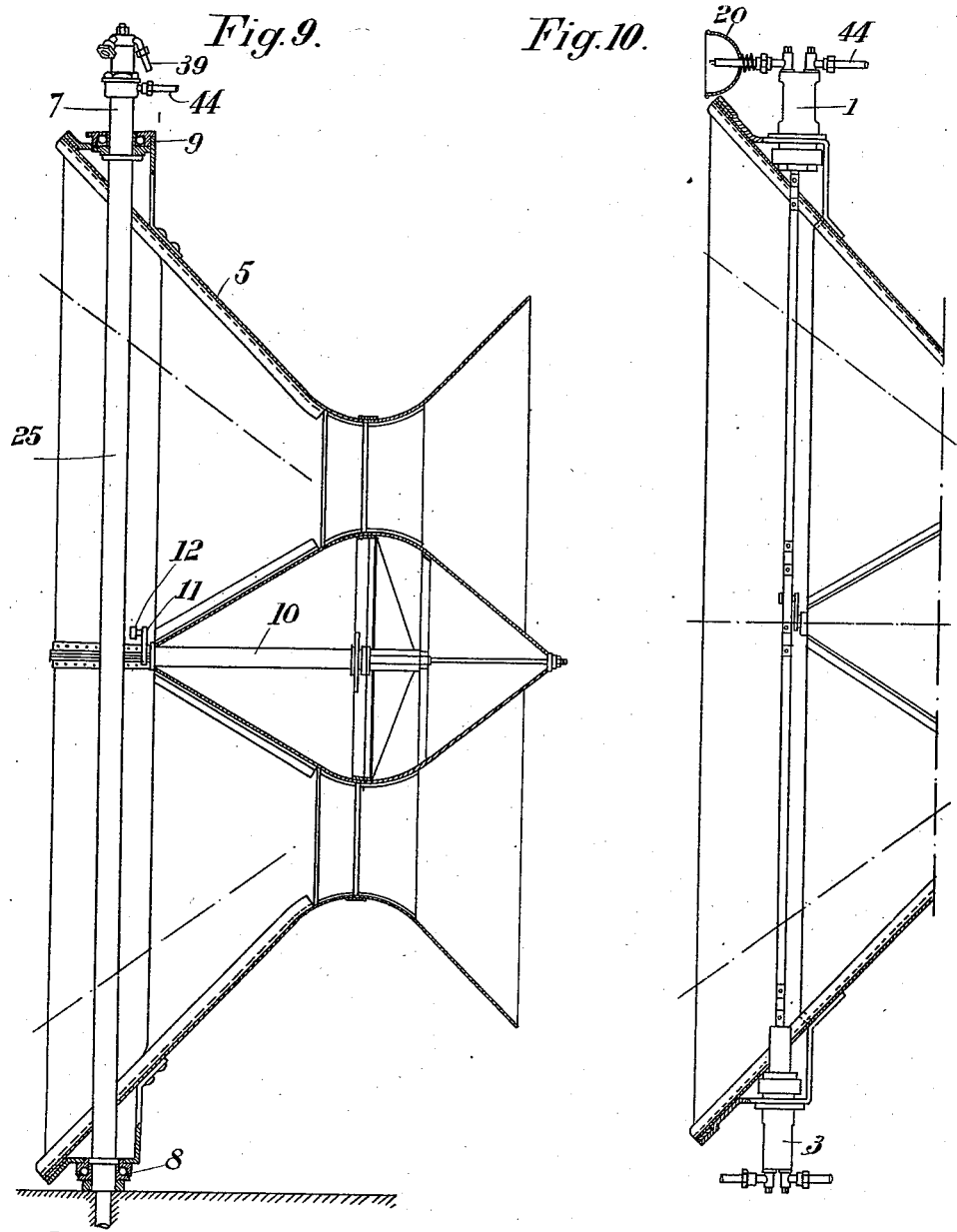

UNITED STATES PATENT OFFICE.

STÉPHANE PICHAULT, OF VALENCIENNES, FRANCE.

WINDMILL-ACTUATED AIR-COMPRESSOR.

1,000,690.

Specification of Letters Patent. Patented Aug. 15, 1911.

Original application filed February 24, 1906, Serial No. 303,008. Divided and this application filed February 12, 1908. Serial No. 415,556.

*To all whom it may concern:*

Be it known that I, STÉPHANE PICHAULT, a citizen of the French Republic, and resident of Valenciennes, in the North Department, France, have invented certain new and useful Improvements in Windmill-Actuated Air-Compressors, of which the following is a specification.

This invention relates to air-compressors and more especially to a wind-mill actuated air-compressor plant, its object being to provide a compressor plant of this kind comprising a plurality of coöperating pumps and adapted to be used in connection with the wind-mill or aeromotor described in my co-pending application Ser. No. 303,008, of which the present one is a divisional application.

The invention further contemplates the provision of a device connected with the intake duct of the compressor and adapted to control the inlet opening of said duct according to the pressure of wind at a given moment.

The invention has still for its object to provide a special pressure regulator between the various receivers of the compressors' plant and finally to provide a special flexible connection between the pump pistons and the common crank-pin of the wind-mill power-shaft.

In the accompanying drawings:—Figure 1 is a diagrammatic view of the whole compressor plant, showing the relative arrangement of the pumps, receivers and pressure regulators and intake control but not the connection of these members with the wind-mill. Fig. 2 is a vertical section through the low pressure pump of the plant provided with the wind-controlled intake regulator. Fig. 3 is a vertical section through one of the intermediate tanks or receivers hereafter referred to. Fig. 4 is a longitudinal section of one of the pressure controlling devices used in the plant. Figs. 5, 6 and 7 show respectively a side elevation, top plan and horizontal section of details hereafter referred to. Figs. 8, 9 and 10 show the connection of the compressor pumps with the inlet funnel horizontal power shaft and vertical pivot of the wind-mill described in my application No. 303,008. Fig. 8 is a front elevation of the said wind-mill inlet funnel carrying the parts of the compressor plant. Fig. 9 is a vertical section of same on line A—B of Fig. 8, which line is also the axial line of the vertical oscillating pivot of the inlet funnel of the wind-mill. Fig. 10 is a sectional view (partly in elevation) on line C—D of Fig. 8 which is also the axis of one of the compressing pumps.

The compressor plant comprises a plurality of pumps and in the example given in the drawings four pumps are shown and designated by 1, 2, 3 and 4. These pumps operate in the manner described later on and deliver the air into each other thus compressing it more and more.

The number of the pumps may be modified at will but all are mounted, as well as the members combined therewith, on the inlet funnel 5 of the wind-mill 6 described in my application Ser. No. 303,008, which funnel is adapted to rotate on the vertical shaft 7 through the medium of ball bearings 8, 9, as shown by Fig. 9 so as to be able to adjust itself according to the direction of the wind. The turbine shaft 10 carries at its front end a crank 11 having a crank pin 12. This pin is surrounded by a sleeve 13 which is mounted thereon by means of a ball bearing and to which are rigidly connected as many spring blades 14 as there are pumps mounted on the funnel, the outer ends of these spring blades being rigidly connected with the inner end of the connecting rods 15 of the pumps 1, 2, 3 and 4. As will be readily seen the said spring blades 14 are adapted to slightly yield when shocks are experienced and to thus reduce the bad effects and increasing the efficiency of the machine.

The pumps used for performing the compression may be single or double-acting. Fig. 2 of the drawings shows a single acting pump 1 having inlet and escape valves 16, 17, the rods of which move in long guide ways. The inlet pipe 18 of the pump is provided with a controlling device comprising a tubular slide valve 19 adapted to slide on the inlet pipe 18 on which it may be moved to and fro. This tubular slide valve 19 is rigidly connected with a cup 20. The tubular seat 18 of the cylindrical slide valve 19 is provided near its outer end with elongated triangular openings 21. The front end of pipe 18 carries beyond the holes 21 an abutting ring 22 and is closed at its front end by a screw plug 23. A spring 24 surrounding the pipe 18 is adapted to act against the rear wall of cup 20 and to hold the slide valve 19 at rest in a determined position. It will be useful to mount on the pipe 18 an oil distributing lubricator (not shown) intended to furnish the oil to all the pumps 1, 2, 3, 4. The other pumps 2, 3, 4 are constructed in the same manner as the pump 1 just described though they are not provided with the particularly-shaped air-inlet device 18—24. Their peculiar connection will be described later on.

Between the several pumps 1, 2, 3, 4 intermediate receivers 25, 26, 27 are provided which are connected in a suitable manner with the pump piping and are adapted to temporarily store up the compressed air delivered by the respective pumps. These receivers are provided each with a non-return valve 28 (Fig. 3) as well as with devices 29, 30 adapted to close the inlet and outlet of the receiver.

Between the different intermediate receivers 25, 26, 27 as well as between the last receiver 27 and the corresponding main reservoir hereafter referred to are mounted the devices 31, 32, 33 which will be called hereafter automatic pressure-compensating devices. As shown more in detail by Fig. 4, these devices contain each a slide valve 34 which is adapted to move in a suitable guideway and is interposed between a coiled spring 35 and a plurality of lens-shaped diaphragms 36 filled with an elastic material. The normal position of the slide valve 34 may be adjusted for any desired tension by tensioning more or less the coiled spring 35. The said slide valve is adapted to cut off in its normal position the communication between the receivers between which it is inserted.

As the pumps 1, 2, 3, 4, and the intermediate receivers 25, 26, 27 are mounted on the funnel 5 of the windmill, while the other parts of the plant such as the ducts leading to the places of consumption and the stationary storage tanks hereafter referred to are stationary, means have to be provided which allow of the said members carried by the funnel being put into constant communication with said stationary members whatever be the position of said funnel. To this end the movable pipe connection shown by Figs. 5, 6, 7, 8, and 9 has been provided at the top of the vertical pivot 7 of the funnel 5. I shall describe the connection for one duct only it being understood that the construction is similar for the other ducts and that the number of these connections provided in the top part of the pivot 7, must correspond to the number of ducts to be connected. As readily seen from the drawing the stationary pivot 7 is pierced with a vertical passage 37 and is rigidly connected at its top with a lateral tubular extension 38 to which the stationary duct 39 is connected by any suitable means. The lower end of the passage is in communication with a short horizontal passage 40 which ends in an annular channel 41 provided in a stuffing box 42 mounted in a rotary manner in the top of said pivot 7; the said stuffing box is provided with a tubular extension 43 to which is connected by any suitable means the duct 44. The drawing shows only one of these independent stuffing boxes 42 and duct 44 connected therewith. However, the number of these stuffing boxes must be the same as the number of ducts necessary. The drawing also shows only three passages similar to 37 provided in the upper part of pivot 7; however, in place of these three channels there could be four or any number required.

The function of the device described is as follows: As it will presently be described the arrangement of the pumps is such that they work in a cascade-like manner and that there is only one pump 1 which sucks in the atmospheric air. This pump only is therefore provided with the inlet-controlling device shown by Fig. 2. This device, owing to the fact that it is mounted on the rotary funnel 5, is always pointed so that its opening is directed toward the wind which always rushes directly into the cup 20 and causes it to move backward more or less according to its actual force, thus causing the tubular slide valve 19 to compress the coiled spring 24. Owing to the backward motion of said slide valve the openings 21 are more or less opened. When the force of the wind decreases the slide-valve 19 under the impulse of the spring 24 again moves forward thereby closing again more or less the openings 21. As readily seen the admission of air into the first pressure pump 1 of the plant is put under the automatic control of the wind itself. If the wind is weak, the inlet openings 21 are reduced accordingly by the action of the coiled spring 24; consequently the work to be furnished by the pump at each revolution of the turbine shaft of the wind-mill is also reduced. But as soon as the force of the wind increases it compresses more and more the spring 24 until the openings 21 are entirely uncovered thus allowing the pumps to work in full and to furnish the maximum of work at each revolution.

The manner of filling the intermediate reservoirs and associated parts may be described as follows: The wind striking the funnel 5 enters the air intake controller 20, penetrates through the openings 21 into the pump 1 which has the largest diameter. When the apparatus is being started and the other reservoirs and the pipes are still under atmospheric pressure the air escapes, so to speak, freely and enters a storing receptacle 45, passing through the scarcely lifted valves of the pumps 2, 3, 4, as well as through the pressure controlling devices 31, 32, 33, which, of course, are all open, but as soon as the whole pressure attains the height at which the closure of 31 takes place, the pistons of pumps 2 begin to compress the air in an efficient manner. The same occurs in pumps 3, 4, when 32, 33 are closed in turn.

The air sucked in and compressed by pump 1 is delivered by this pump into the pipe 44 and then flows through the ducts 43, 40, 37, 38 into the pipe 39 leading to reservoir 45 (Fig. 1) wherefrom it flows to the place of its utilization under a pressure which preferably should be lower than four atmospheres. The non-employed part of this air, if there is an excess of air delivered by pump 1, flows through pipe 46 into the intermediate receiver 25 mounted on funnel 5. It is sucked in from this receiver by the intake pipe 47 of pump 2 which delivers it through pipe 48 and a rotary connection (similar to 43, 40, 37, 38) provided in the top part of pivot 7 and pipe 59 into a second stationary utilizing tank 49 (similar to 45) wherefrom the air flows to its place of consumption under a pressure which preferably should not be lower than 16 atmospheres. The non-employed part of this air, if there is an excess, flows through pipe 49' into the second intermediate receiver 26 mounted on the funnel 5. It is sucked in from this receiver through pipe 50 by the pump 3 and delivered through pipe 51 into the intermediate receiver 27 wherefrom pump 4 sucks it in through pipe 52 and delivers it through pipe 53 and a rotary connection (similar to 43, 40, 37, 38) provided in the top part of pivot 7 and pipe 60 into the last or high-pressure storing-tank 54 which is provided with a safety valve (not shown).

When four pumps are employed the pistons of which have the same lengths of stroke and the diameters of which are proportionate to the numbers 8, 4, 2, 1, it is possible to have: 4 atmospheres in the receiver 25, 16 atmospheres in the receiver 26, 64 atmospheres in the receiver 27, and 256 atmospheres in the high-pressure storing-tank 54, these results being obtained theoretically by the simple revolution of the turbine shaft an indeterminate number of times. The said ducts and receivers have suitable dimensions so as to cause variations of temperature to remain confined between practical limits.

The tension-controlling devices 31, 32, 33 are intended to prevent the pressure falling under a determined limit in the various intermediate receivers, these pressure-controlling devices acting as follows: When in any of the said intermediate receivers the pressure becomes lower than the determined normal tension for which the slide valve 34 has been adjusted the elastic lens-shaped diaphragms 36 of the tension-controlling device which immediately follows the said intermediate receiver, expand and cause the said slide valve 34 to move downward. Thus the said receiver is connected with the following receiver wherein a higher tension exists and the more highly compressed air contained in the last named receiver flows back into the first one. The flow of compressed air takes place until the desired normal pressure is again obtained so that the lens-shaped diaphragms 36 are again compressed thus allowing the slide valve 34 to rise again under the influence of the spring 35 and to cut off once more the communication between the said receivers.

What I claim is:—

1. The combination with a wind wheel, a vertical shaft on which the wheel is rotatably mounted, the horizontal crank-shaft and the crank and crank pin, of a series of pumps adapted to deliver into each other and arranged in a circle around said crank shaft and adapted to turn with the wheel on the vertical shaft, a series of intermediate receivers arranged between the pumps, stuffing boxes surrounding the vertical shaft, valve ducts connecting the receivers with the stuffing boxes, stationary utilizing reservoirs one of which is arranged after the last pump of the series and forms a high-pressure storing reservoir, ducts connecting the stuffing boxes with the said reservoirs, an air-inlet regulating apparatus in advance of the first pump which latter sucks in from the atmosphere, and pressure-reducing controllers adapted to maintain in the reservoirs a determined minimum pressure provided there be a higher pressure in the high pressure reservoir, substantially as and for the purpose set forth.

2. The combination with a wind wheel, a vertical shaft on which the wheel is rotatably mounted, and a horizontal crank shaft, of a pump operated from said crank shaft, a receiver for compressed air, a connection between said receiver and said pump, an inlet pipe for said pump provided with air inlet openings, a tubular slide valve adapted to slide on said inlet pipe and more or less uncover said openings, a cup to which the said slide valve is connected and a spring surrounding the inlet pipe and arranged to act upon the slide valve, all arranged for coöperation as described.

3. In an air compressing plant, the combination with the admission pipe of the low pressure pump, said pipe having admission openings, a tubular slide valve slidably mounted on the said admission pipe and adapted to control the admission openings of the said pipe, a cup secured to the said tubular slide-valve and having its opening directed toward the said admission openings of the said admission pipe, a stop arranged on the said admission pipe, a coiled spring interposed between the said stop and the said tubular slide valve and means for pointing the opening of the said cup toward the direction wherefrom the wind blows, substantially as and for the purpose set forth.

4. In an air compression plant the combination with a plurality of compressing pumps adapted to gradually elevate the pressure of the air, of a wind-controlled admitting device for the low pressure pump, a main reservoir for the compressed air, a plurality of intermediate reservoirs arranged between the said compression pumps, suitable connections between the said reservoirs and pumps, non-return valves and circulation cut-out devices arranged between the said reservoirs, pressure-controlling devices interposed between the said reservoirs and each composed of a suitable chamber, a part in the said chamber connected with the preceding or lower pressure reservoir, a second part arranged in the said chamber and connected with the following or higher pressure reservoir, a slide valve arranged in the said chamber and adapted to control the said second part, a plurality of lens-shaped diaphragms filled with an elastic material and interposed between one end of the said slide valve and one of the small walls of the said casing, a coiled spring interposed between the other end of the said slide valve and the opposite small wall of the casing, and means for controlling the tension of the said spring, substantially as and for the purpose set forth.

5. In combination with a power-shaft and its crank, and crank pin, a plurality of pump pistons, connecting rods pivotally connected at one end with the pistons, and spring blades connected with the other end of the connecting rods and with the crank pin and forming a flexible connection between the said rods and said crank pin for the purpose set forth.

In testimony whereof I have hereunto set my hand in presence of two witnesses.

STÉPHANE PICHAULT.

Witnesses:
  FRANÇOIS BUISSET,
  CONSTANT DUBUY.